US010416776B2

(12) United States Patent
Dash

(10) Patent No.: US 10,416,776 B2
(45) Date of Patent: Sep. 17, 2019

(54) INPUT DEVICE INTERACTION

(71) Applicant: INTERNATIONAL BUSINESS MACHINES CORPORATION, Armonk, NY (US)

(72) Inventor: Samir K. Dash, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 14/863,832

(22) Filed: Sep. 24, 2015

(65) Prior Publication Data

US 2017/0090747 A1     Mar. 30, 2017

(51) Int. Cl.
| | |
|---|---|
| *G09G 5/00* | (2006.01) |
| *G06F 3/01* | (2006.01) |
| *G06F 1/16* | (2006.01) |
| *G06F 3/03* | (2006.01) |
| G06F 3/0488 | (2013.01) |

(52) U.S. Cl.
CPC ............ *G06F 3/017* (2013.01); *G06F 1/163* (2013.01); *G06F 3/011* (2013.01); *G06F 3/014* (2013.01); *G06F 3/0304* (2013.01); *G06F 3/04886* (2013.01)

(58) Field of Classification Search
CPC ........ G06F 3/017; G06F 3/0304; G06F 3/014; G06F 1/163; G06F 3/011; G06F 3/167; G06F 3/033; G06F 3/04886; G09G 5/00
See application file for complete search history.

(56) References Cited

U.S. PATENT DOCUMENTS

| | | | |
|---|---|---|---|
| 6,346,929 B1 * | 2/2002 | Fukushima | G06F 3/013 345/156 |
| 8,228,315 B1 | 7/2012 | Starner et al. | |
| 8,482,527 B1 * | 7/2013 | Kim | G06F 3/011 345/168 |
| 8,542,206 B2 | 9/2013 | Westerman et al. | |
| 8,687,848 B2 | 4/2014 | Bran et al. | |
| 2010/0156836 A1 * | 6/2010 | Katayama | G01S 5/16 345/173 |

(Continued)

OTHER PUBLICATIONS

Tammaru, Terttu et al; History of Calculating Devices; European Student Conference; 2010; 8 pages.

(Continued)

*Primary Examiner* — Nicholas J Lee
*Assistant Examiner* — Gerald L Oliver
(74) *Attorney, Agent, or Firm* — Schmeiser, Olsen & Watts; Mark C. Vallone

(57) ABSTRACT

A method and system for interacting with an input device is provided. The method includes initializing a virtual keyboard viewable via an eyewear based video display enabled computing device. The eyewear based video display enabled computing device determines that two hands of a user are viewable via a view screen of the eyewear based video display enabled computing device. In response, characters or symbols of the virtual keyboard are mapped to a position and associated scaling of the two hands of the user. Movement of the hands is tracked and associated with gestures enabled by the movement. The associated gestures are converted into associated characters or symbols and input data specified by the user is received.

19 Claims, 14 Drawing Sheets

(56) References Cited

U.S. PATENT DOCUMENTS

| | | | | |
|---|---|---|---|---|
| 2010/0241985 | A1* | 9/2010 | Kim | G06F 3/04886 715/773 |
| 2012/0212398 | A1* | 8/2012 | Border | G02B 27/017 345/8 |
| 2012/0256860 | A1 | 10/2012 | Justice | |
| 2013/0016070 | A1* | 1/2013 | Starner | G02B 27/017 345/175 |
| 2013/0212515 | A1 | 8/2013 | Eleftheriou | |
| 2013/0246930 | A1* | 9/2013 | Paushkina | G06F 3/017 715/739 |
| 2013/0278501 | A1* | 10/2013 | Bulzacki | G06F 3/017 345/157 |
| 2014/0055343 | A1* | 2/2014 | Kim | G06F 3/005 345/156 |
| 2015/0006405 | A1* | 1/2015 | Palmer | G06Q 20/38215 705/72 |
| 2015/0187357 | A1* | 7/2015 | Xia | G06F 1/163 704/275 |
| 2015/0205358 | A1* | 7/2015 | Lyren | G06F 3/0484 715/765 |
| 2015/0293592 | A1* | 10/2015 | Cheong | G06F 3/016 345/173 |
| 2015/0363001 | A1* | 12/2015 | Malzbender | G06F 3/017 706/18 |
| 2015/0370327 | A1* | 12/2015 | Jiang | G06F 3/015 345/156 |
| 2016/0026253 | A1* | 1/2016 | Bradski | G06F 3/0304 345/8 |
| 2016/0246370 | A1* | 8/2016 | Osman | A63F 13/428 |

OTHER PUBLICATIONS

Mistry, Pranav; Sixth Sense—Integrating Information with the Real World; Retrieved from the Internet URL: http://www.pranavmistry.com/projects/sixthsense/; retrieved on Apr. 22, 2015; 5 pages.

Keskin, C. et al.; Real Time Hand Tracking and 3D Gesture Recognition for Interactive Interfaces Using HMM; In Proceedings of International Conference on Artificial Neural Networks; Jun. 26-29, 2003; 4 pages.

Lee, Seong Jae et al.; Finger Gesture Using Microphone Arrays; Retrieved from the Internet URL: http://homes.cs.washington.edu/~jortiz16/images/NetworkingFinalReport.pdf; retrieved on Apr. 22, 2015; 5 pages.

Norton, Quinn; A Sixth Sense for a Wired World; Retrieved from the Internet URL: http://archive.wired.com/gadgets/mods/news/2006/06/71087?currentPage=all; Retrieved on Apr. 22, 2015; 2 pages.

Sato, Yoichi et al.; Fast Tracking of Hands and Fingertips in Infrared Images for Augmented Desk Interface; Proceedings of the Fourth IEEE International Conference on Automatic Face and Gesture Recognition; Mar. 2000; 6 pages.

Wikipedia; Infrared Vision; Retrieved from the Internet URL: http://en.wikipedia.org/wiki/Infrared_vision; Retrieved on Apr. 22, 2015; 4 pages.

Wojtczuk, Piotr et al.; PIR Sensor Array for Hand Motion Recognition; Second International Conference on Sensor Device Technologies and Applications; Aug. 27-29, 2011; pp. 99-102.

Breuer, Pia et al.; Hand Gesture Recognition with a Novel IR Time-of-Flight Range Camera—A Pilot Study; Third International Conference, Mirage; Mar. 28-30, 2007; pp. 247-260.

Intellectual Property Brief; Google Obtained Patent for Love-shaped Gesture; Retrieved from the Internet URL: http://www.ipbrief.net/2013/10/28/google-obtained-patent-for-love-shaped-gesture/; Retrieved on Apr. 22, 2015; 8 pages.

Silicon Labs; Infrared Gesture Sensing; AN580; Feb. 2011; 10 pages.

Tehrani, Rich; Wearable computing: Your Hand Becomes the Keyboard; Retrieved from the Internet URL: http://blog.tmcnet.com/blog/rich-tehrani/google/wearable-computing-your-hand-becomes-the-keyboard.html; Retrieved on Apr. 22, 2015 (dated Jan. 19, 2013); 6 pages.

* cited by examiner

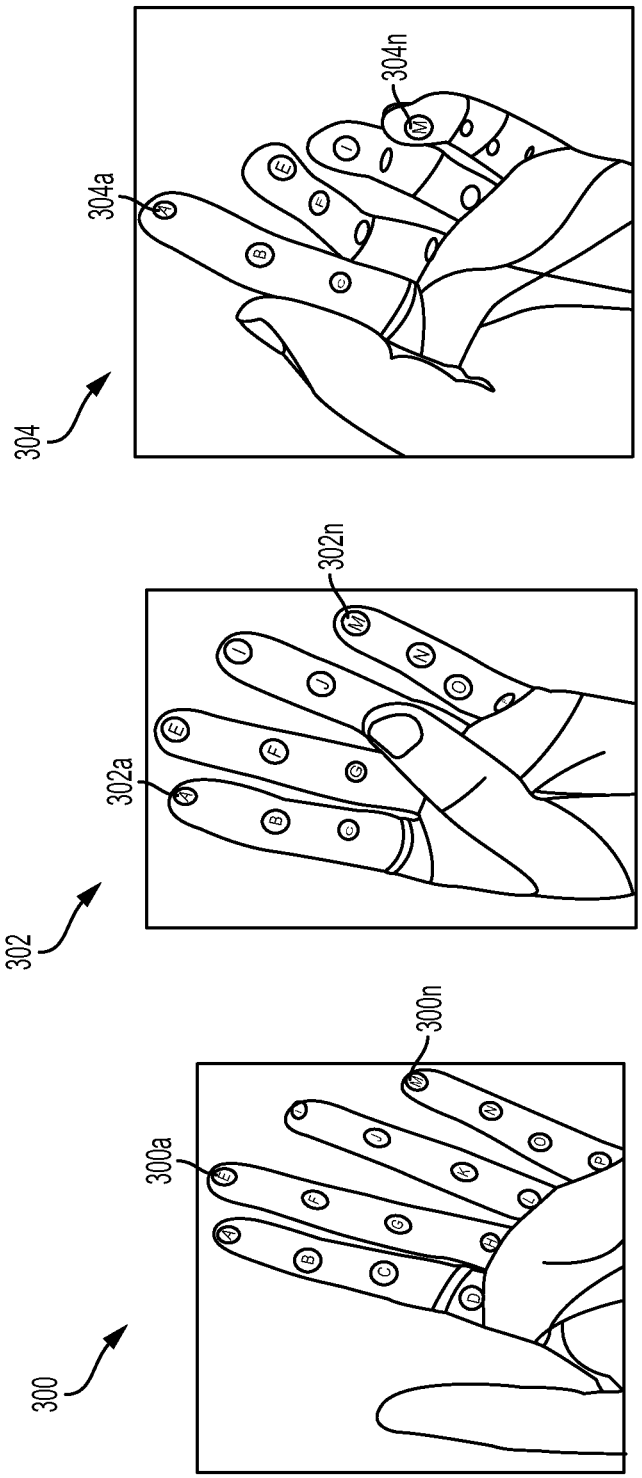

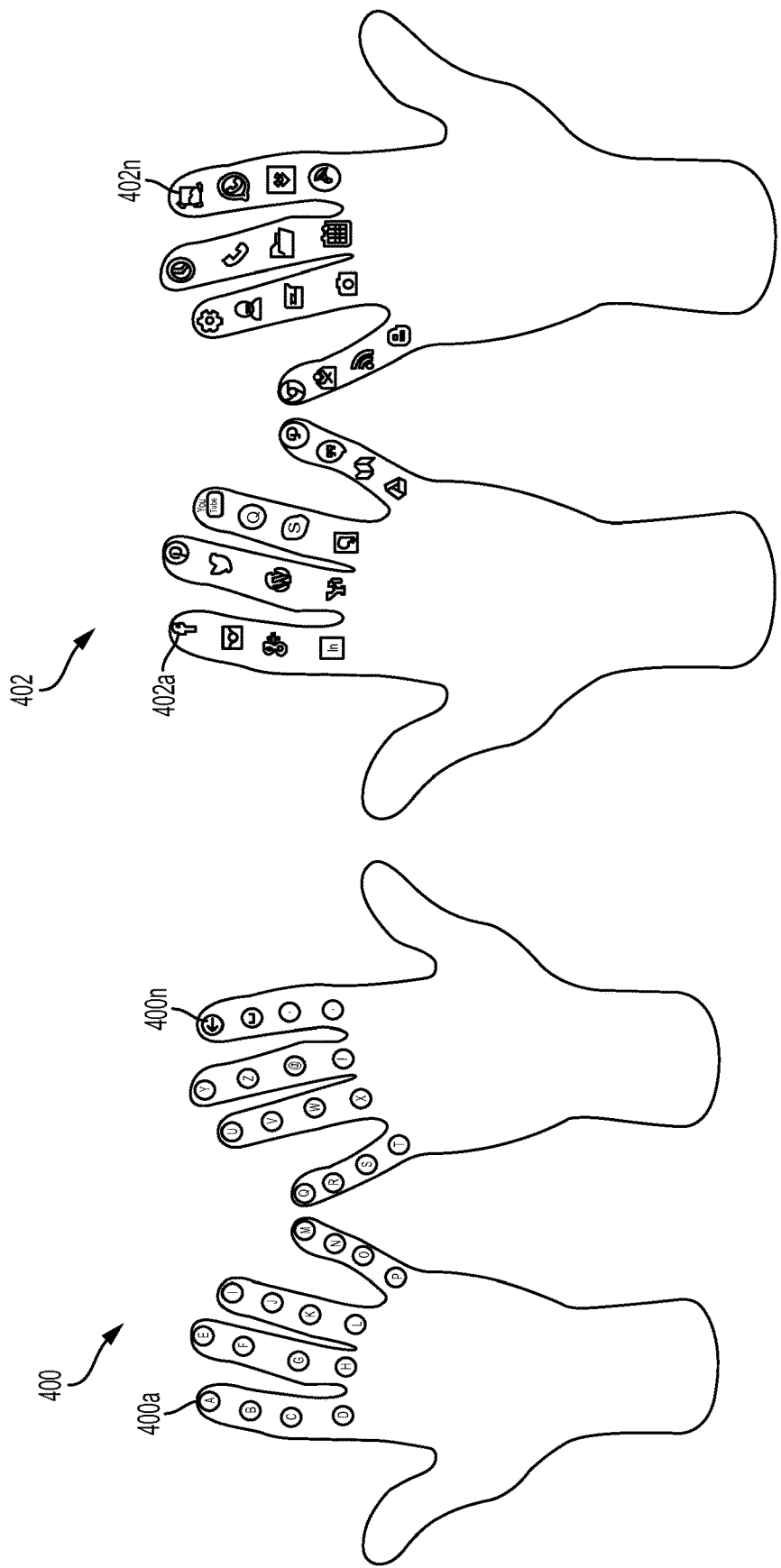

INPUT DEVICE INTERACTION

FIELD

The present invention relates generally to a method for interacting with an input device and in particular to a method and associated system for enabling a set of gestures with an input device via usage of an eyewear based computing device.

BACKGROUND

Associating data input with a system typically includes an inaccurate process with little flexibility. Resolving input issues may include a complicated process that may be time consuming and require a large amount of resources. A data input process may not take into account all related gestures and therefore is unable to execute appropriate actions. Accordingly, there exists a need in the art to overcome at least some of the deficiencies and limitations described herein above.

SUMMARY

A first aspect of the invention provides an input device interaction method comprising: initializing, by a computer processor of an embedded computing device comprised by an eyewear based video display enabled computing device in response to a command from a user, a virtual keyboard viewable via the eyewear based video display enabled computing device; determining, by the computer processor, that two hands of the user are viewable via a view screen of the eyewear based video display enabled computing device; mapping, by the computer processor, characters or symbols of the virtual keyboard to a position and associated scaling of the two hands of the user; tracking, by the computer processor, movements of the two hands; associating, by the computer processor based on the tracking, the movements with associated gestures enabled by the movements; converting, by the computer processor, the associated gestures into associated characters or symbols of the characters or symbols; and receiving, by the computer processor from the associated characters or symbols enabled by the user, input data specified by the user.

A second aspect of the invention provides an embedded computing device comprising a computer processor coupled to a computer-readable memory unit, the memory unit comprising instructions that when executed by the computer processor implements an input device interaction method comprising: initializing, by the computer processor in response to a command from a user, a virtual keyboard viewable via an eyewear based video display enabled computing device of the embedded computing device; determining, by the computer processor, that two hands of the user are viewable via a view screen of the eyewear based video display enabled computing device; mapping, by the computer processor, characters or symbols of the virtual keyboard to a position and associated scaling of the two hands of the user; tracking, by the computer processor, movements of the two hands; associating, by the computer processor based on the tracking, the movements with associated gestures enabled by the movements; converting, by the computer processor, the associated gestures into associated characters or symbols of the characters or symbols; and receiving, by the computer processor from the associated characters or symbols enabled by the user, input data specified by the user.

A third aspect of the invention provides computer program product, comprising a computer readable hardware storage device storing a computer readable program code, the computer readable program code comprising an algorithm that when executed by a computer processor of an embedded computing device implements an input device interaction method, the method comprising: initializing, by the computer processor in response to a command from a user, a virtual keyboard viewable via an eyewear based video display enabled computing device of the embedded computing device; determining, by the computer processor, that two hands of the user are viewable via a view screen of the eyewear based video display enabled computing device; mapping, by the computer processor, characters or symbols of the virtual keyboard to a position and associated scaling of the two hands of the user; tracking, by the computer processor, movements of the two hands; associating, by the computer processor based on the tracking, the movements with associated gestures enabled by the movements; converting, by the computer processor, the associated gestures into associated characters or symbols of the characters or symbols; and receiving, by the computer processor from the associated characters or symbols enabled by the user, input data specified by the user.

The present invention advantageously provides a simple method and associated system capable of associating data input with a system.

BRIEF DESCRIPTION OF THE DRAWINGS

FIGS. 3A-3C illustrate multiple hand views as viewable via a display/transparent reflector, in accordance with embodiments of the present invention.

FIG. 4A illustrates a keyboard mode viewable via a display/transparent reflector, in accordance with embodiments of the present invention.

FIG. 4B illustrates an application menu mode viewable via a display/transparent reflector, in accordance with embodiments of the present invention.

FIG. 10, including

DETAILED DESCRIPTION

Figure 1:
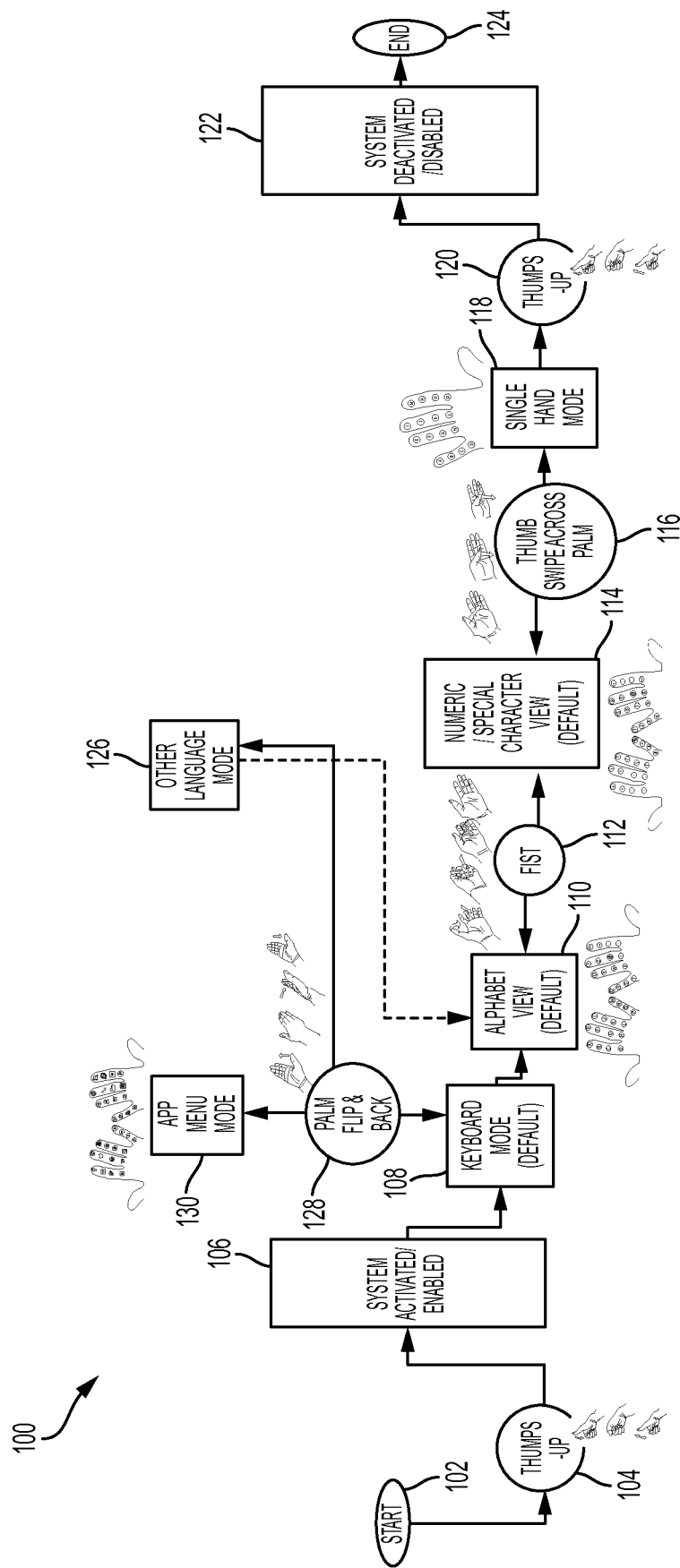
FIG. 1 illustrates a system for enabling a process for interacting with an input device, in accordance with embodiments of the present invention.

FIG. 1 illustrates an input interaction algorithm 100 for enabling a process for interacting with a virtual input device, in accordance with embodiments of the present invention. Algorithm 100 is executed by components enabling a process for superimposing/rendering characters/symbols over finger-tips and finger-joints viewable via an eyewear based video display enabled computing device and detecting hand gestures (fist, palm flip, thumbs up and down, thumbs slide, double tap, etc.) for interaction with a virtual interface displayed on a portion of the users hand. Algorithm 100 allows for dynamically switching between different virtual keyboard views/layouts based on the hand gestures while interacting with a superimposed virtual keyboard displayed on the users hand. The algorithm 100 is executed by a specialized hardware device (comprising an eyewear based video display enabled computing device or independent from an eyewear based video display enabled computing device) comprising specialized (non-generic) hardware and circuitry (i.e., specialized discrete non-generic analog, digital, and logic based circuitry) for executing the process described with respect to FIG. 1. The specialized discrete non-generic analog, digital, and logic based circuitry may include proprietary specially designed components (e.g., a specialized integrated circuit designed for only implementing an automated process for allowing input interaction). Algorithm 100 is implemented as a software application running on the eyewear based video display enabled computing device (e.g., a smart-eye-wear device) that when enabled, renders a virtual keyboard on a palm of a user via a viewport of the eye wear device. In response, the specialized hardware device recognizes the palm of the user visible through the view port and detects finger tips and joints of the user's hand. Upon detection, letters, numbers, symbols, and characters are virtually super-imposed on the user's hands via the viewport and the letters, numbers, symbols, and characters are continuously updated based on detected changes in hand/finger movements, positions, distances, and angles within a 3 dimensional space rendered via the viewport.

Algorithm 100 is initiated in step 102 when the specialized hardware device/system is powered up via a manual switch, a voice activated command, etc. In step 104, a user initiates a thumbs up gesture command to enable a virtual keyboard viewable via an eyewear based video display enabled computing device. In step 106, the specialized hardware device/system is activated such that cameras and sensors are enabled for processing gestures and views via an eyewear based video display enabled computing device. In step 108, a virtual keyboard mode is enabled.

In step 128, the user initiates a palm flip gesture command to enable a process for virtually toggling between a list of applications and the keyboard virtual view via the eyewear based video display enabled computing device. In step 130, an application menu is virtually displayed via the eyewear based video display enabled computing device such that the user is able to select an application for use. In step 126, a language selection mode is activated to select a specific language for use in the virtual display of the eyewear based video display enabled computing device.

In step 110, alphabetical letters are virtually placed over the hands of the user via the eyewear based video display enabled computing device. In step 112, a user initiates a fist gesture command to enable a process for virtually toggling between an alphabetical and numerical keyboard virtual view via the eyewear based video display enabled computing device. In step 114, specialized character and numeric views are toggled via the fist gesture. In step 116, the user initiates a thumb swipe gesture to enable a single hand virtual mode to view a single hand for virtually activating the virtual keyboard. In step 104, a user initiates a thumbs up gesture command to disable the virtual keyboard viewable via the eyewear based video display enabled computing device and in response the specialized hardware device/system is deactivated such that cameras and sensors are disabled and the process is terminated in step 124.

Figure 2B:
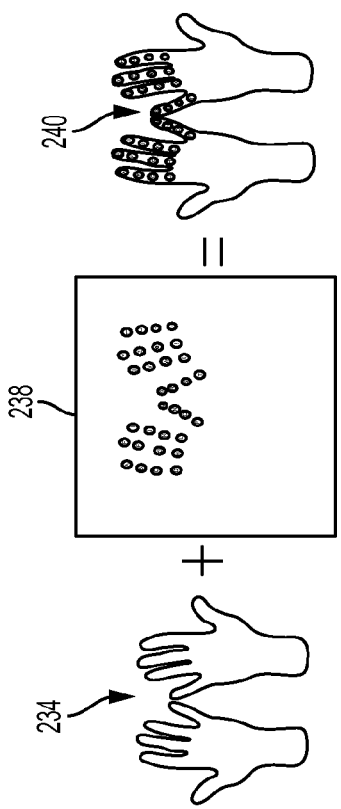
FIG. 2B illustrates multiple views describing differing perceptions associated with the process for interacting with an input device, in accordance with embodiments of the present invention.
Figure 2A:
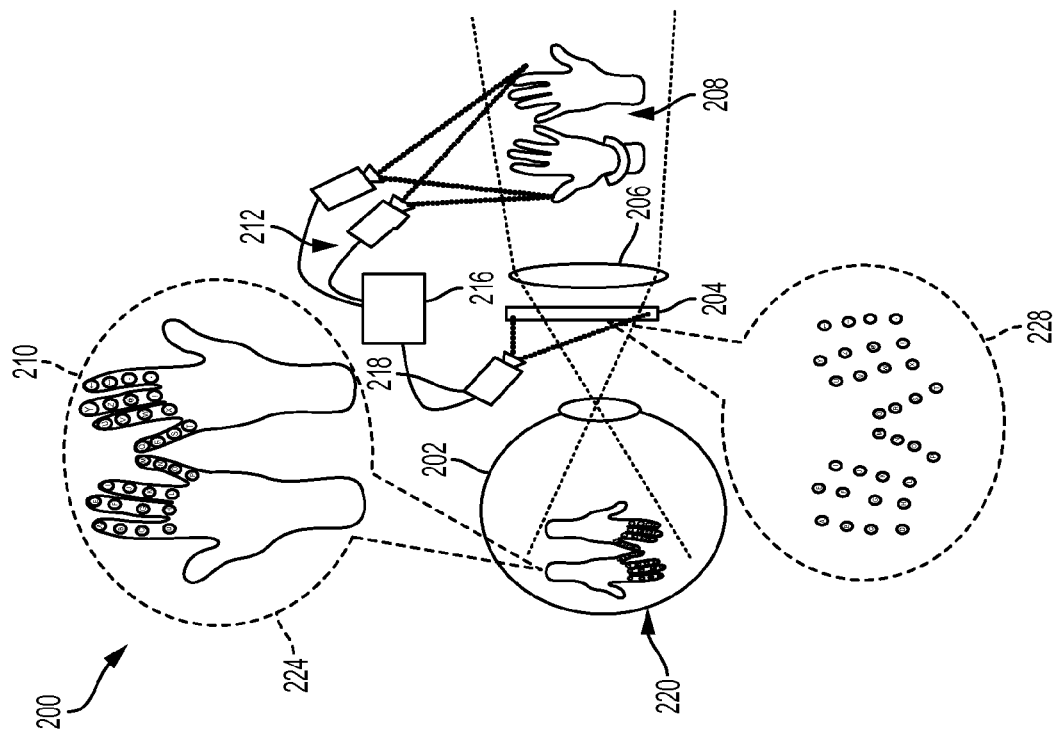
FIG. 2A illustrates a system describing an implementation example implemented via execution of the algorithm of FIG. 1 for enabling a process for interacting with an input device, in accordance with embodiments of the present invention.

FIG. 2A illustrates system 200 describing an implementation example implemented via execution of algorithm 100 of FIG. 1 for enabling a process for interacting with an input device, in accordance with embodiments of the present invention. System 200 comprises a display/transparent reflector 204 (e.g., an eyewear based video display enabled computing device) for reflecting a rendered image generated by a projector and viewable via a user's eye 202. Additionally, a lens 206 (e.g., a prescriptive lens for vision correction) may be included with display/transparent reflector 204. Hands 208 represent a user's actual hands and may comprise additional smart wear or sensors for hand/finger detection technology (e.g., a ring, a wrist band with sensors, etc.). System 200 additionally comprises:

1. Sensors 212 for enabling hand/finger detection technology (e.g. infrared thermal imaging sensor, camera, magnetic wave analyzer, etc.).
2. A microprocessor based hardware specialized hardware device 216 for processing information from sensors 212.
3. A projector 218 for projecting a rendered character map image 228 on display/transparent reflector 204. Rendered character map image 228 is reflected on display/transparent reflector 204 such that the rendering does not comprise an image of hands 208 and only renders mapped characters/symbols using a virtual reality technology.

Reference number 220 illustrates a merged image formed within the user's eye 202. The merged image comprises a combination of rendered character map image 228 and the user's hands 208. Reference number 224 illustrates a final rendered image in the user's mind.

FIG. 2B illustrates multiple views 234, 238, and 240 describing differing perceptions associated with the process for interacting with an input device, in accordance with embodiments of the present invention. View 234 illustrates the user's actual hands. View 238 illustrates a character map projected on a display/transparent reflector based on a position and orientation of the user's hands. View 240 illustrates a perceived view (i.e., perceived by the user) comprising a combination of view 234 and 238.

FIGS. 3A-3C illustrate multiple hand views 300, 302, and 304 as viewable via a display/transparent reflector, in accordance with embodiments of the present invention.

FIG. 3A illustrates virtual characters 300a . . . 300n superimposed over a user's hand as viewable via the display/transparent reflector.

FIG. 3B illustrates virtual characters 302a . . . 302n superimposed over a user's hand (in real time) as viewable via the display/transparent reflector. Some of the virtual characters 302a . . . 302n are hidden by the user's thumb.

FIG. 3C illustrates virtual characters 304a . . . 304n superimposed over a user's hand (in real time) as viewable via the display/transparent reflector. Some of the virtual characters 304a . . . 304n are skewed and distorted by the positioning of the user's fingers.

FIG. 4A illustrates a keyboard mode 400 viewable via a display/transparent reflector, in accordance with embodiments of the present invention. Keyboard mode 400 allows a user to view differing letters, numbers or special characters 400a . . . 400n for entering into a system.

FIG. 4B illustrates an application menu mode 402 viewable via a display/transparent reflector, in accordance with embodiments of the present invention. Keyboard mode 400 allows a user to view differing application icons 402a . . . 402n for triggering and launching associated applications.

Figure 5:
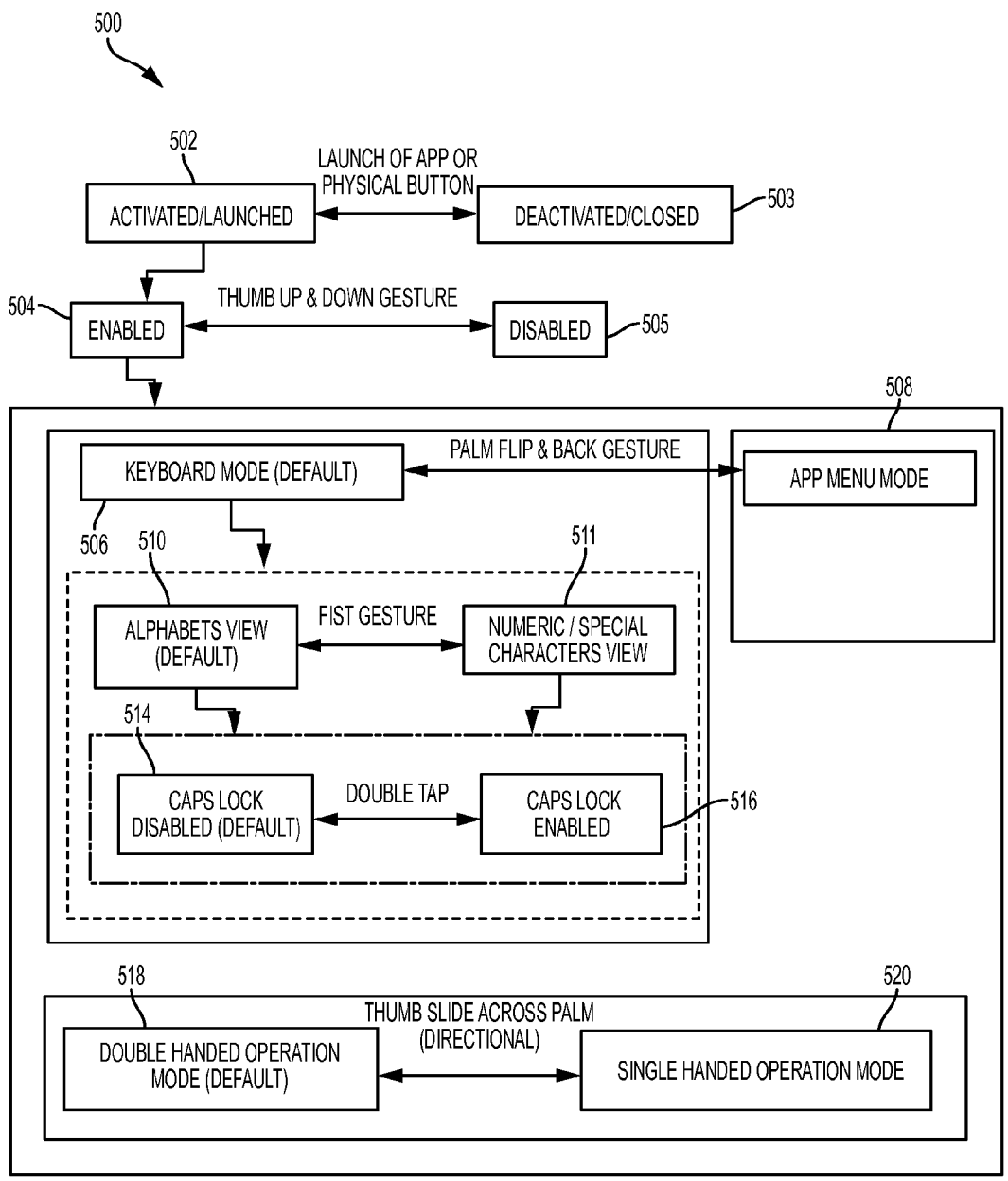
FIG. 5 illustrates an algorithm describing an implementation example for using various gestures for dynamically switching between different virtual keyboard views/layouts and/or modes, in accordance with embodiments of the present invention.

FIG. 5 illustrates an algorithm 500 describing an implementation example for using various gestures for dynamically switching between different virtual keyboard views/layouts and/or modes, in accordance with embodiments of the present invention. Activation step 502 and deactivation step 503 allows a user to activate or deactivate the specialized hardware device of FIG. 1. Steps 504 and 505 allow a user to toggle (via a thumbs up gesture) between enabling and disabling the specialized hardware device of FIG. 1. Steps 506 and 508 allow a user to toggle (via a palm flip gesture) between a keyboard mode and an application menu mode (of a virtual keyboard) for the specialized hardware device of FIG. 1. Steps 510 and 511 allow a user to toggle (via a fist gesture) between an alphabet view and a numeric view (of a virtual keyboard) for the specialized hardware device of FIG. 1. Steps 514 and 516 allow a user to toggle (via a double tap gesture) between a caps lock disabled view and a caps lock enabled view (of a virtual keyboard) for the specialized hardware device of FIG. 1. Steps 518 and 520 allow a user to toggle (via a thumb slide gesture) between double handed operation mode and a single handed operation mode (of a virtual keyboard) for the specialized hardware device of FIG. 1.

Figure 6:
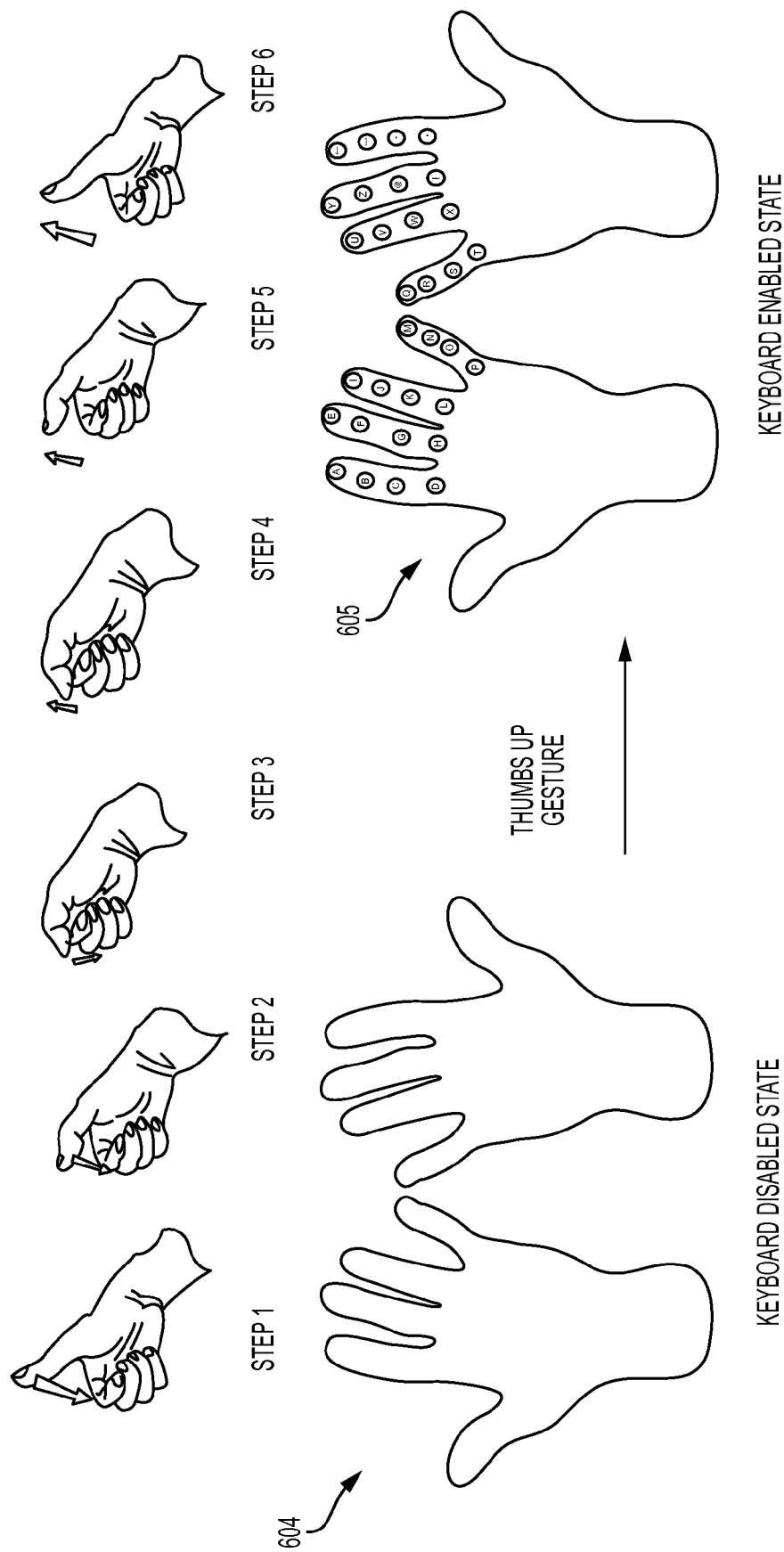
FIG. 6 illustrates steps for implementing a thumbs up gesture for toggling between a disabled state and an enabled state of the system of FIG. 1, in accordance with embodiments of the present invention.

FIG. 6 illustrates steps 1-6 for implementing a thumbs up gesture for toggling between a disabled state and an enabled state of system 100 of FIG. 1, in accordance with embodiments of the present invention.

Steps 1-6 illustrate differing thumb motions for enabling a thumbs up gesture.

Figure 7:
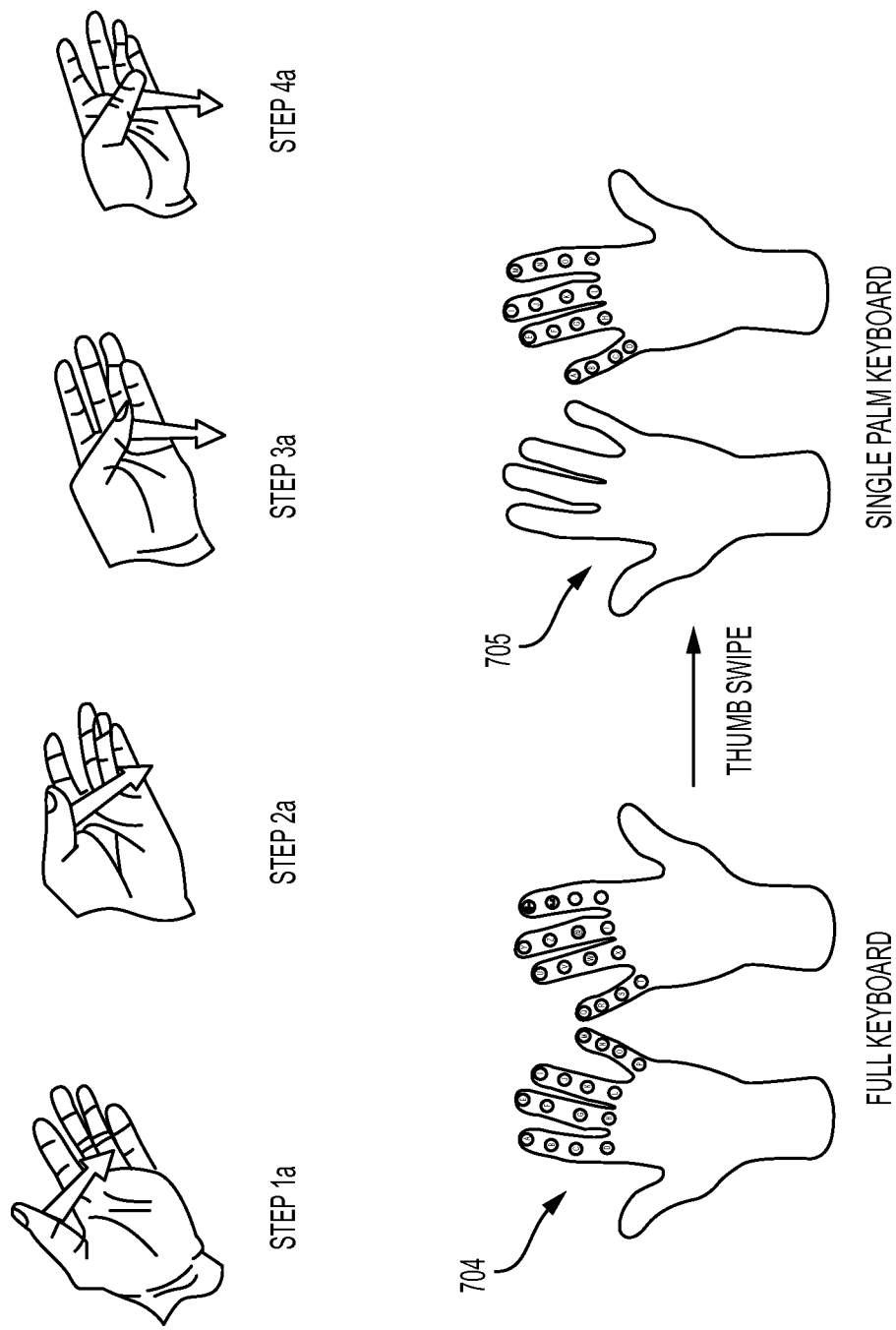
FIG. 7 illustrates steps for implementing a thumb swipe gesture for toggling between a full keyboard mode and a single palm keyboard mode, in accordance with embodiments of the present invention.

FIG. 7 illustrates steps 1a-6a for implementing a thumb swipe gesture for toggling between a full keyboard mode 704 (for two hands) and a single palm keyboard mode 705 (for a single hand), in accordance with embodiments of the present invention. Steps 1a-6a illustrate differing thumb motions for enabling a thumb swipe gesture. The thumb swipe gesture is enabled when a user swipes or slides his/her thumb across his/her palm initiating from one end of the palm to the other. The thumb swipe gesture is enabled to move a portion of a keyboard view appearing on one hand/palm to the other palm based on a direction of the thumb slide. For example (with respect to a left hand), a thumb slide may be initiated with a slide from a left position of the palm towards a right position of the palm thereby moving a portion of the keyboard view rendered on the left palm to the right palm. As an additional example (with respect to a right hand), a thumb slide may be initiated with a slide from a right position of the palm towards the left position of the palm thereby moving a portion of the keyboard view rendered on the right palm to the left palm. If the user enables this gesture in both hands then the keyboard-views are toggled. When the user is operating in a normal keyboard view and enables a fist gesture (from an alphabet keyboard view), he/she is presented with numeric or special characters view of the keyboard etc.

Figure 8:
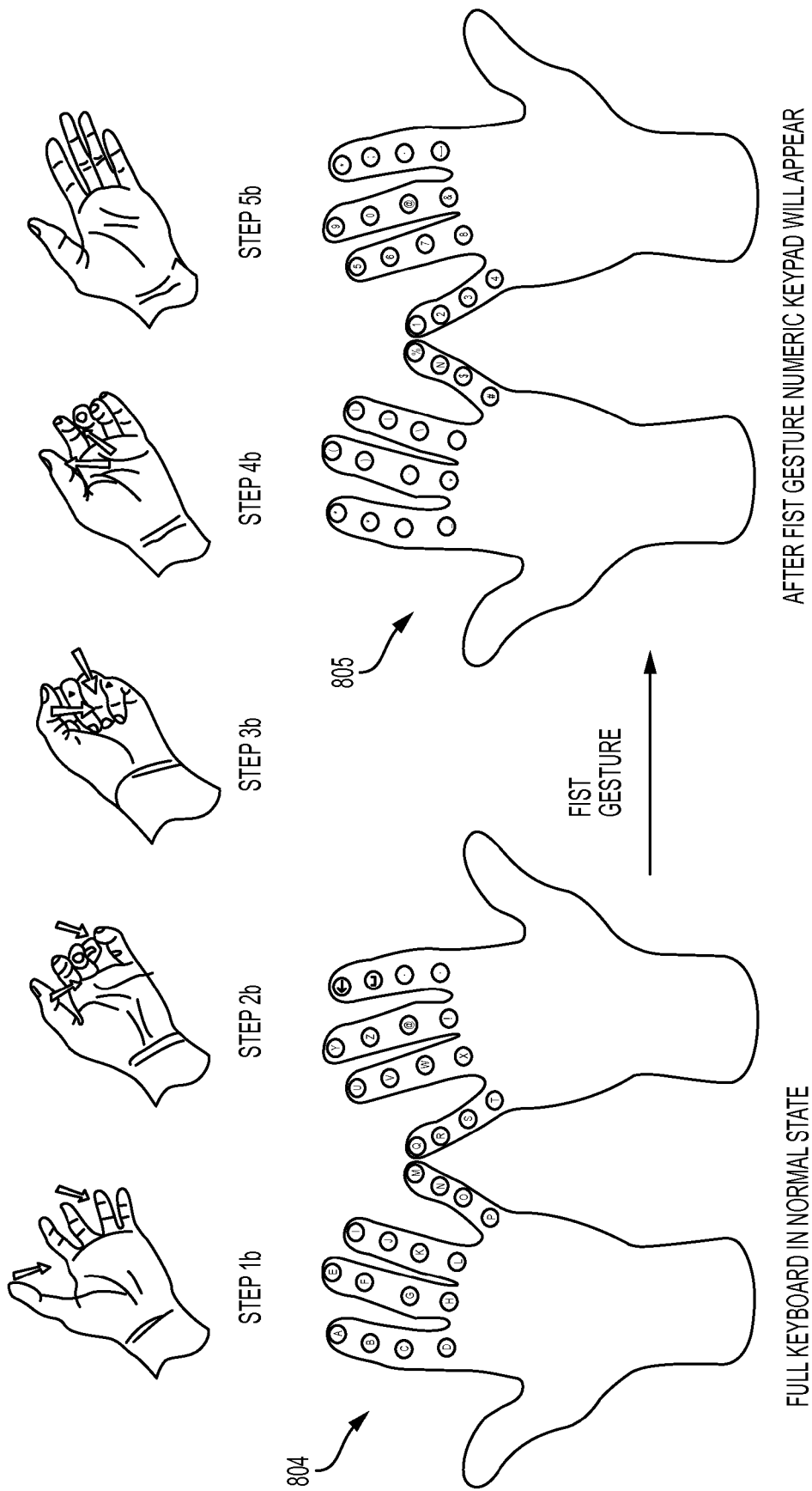
FIG. 8 illustrates steps for implementing a fist gesture for toggling between a full keyboard normal state mode and a numeric keyboard mode, in accordance with embodiments of the present invention.

FIG. 8 illustrates steps 1b-6b for implementing a fist gesture for toggling between a full keyboard normal state mode 804 and a numeric keyboard mode 805, in accordance with embodiments of the present invention. Steps 1b-6b illustrate differing fist motions for enabling a fist gesture. A fist gesture is enabled when a user closes his/her palms to make fist and then opens it again. If the user enables this gesture in both hands then the keyboard-views are/toggled. When the user enables a normal keyboard state mode 804 and makes a fist gesture he/she is presented with numeric mode 805 view of the keyboard.

Figure 9:
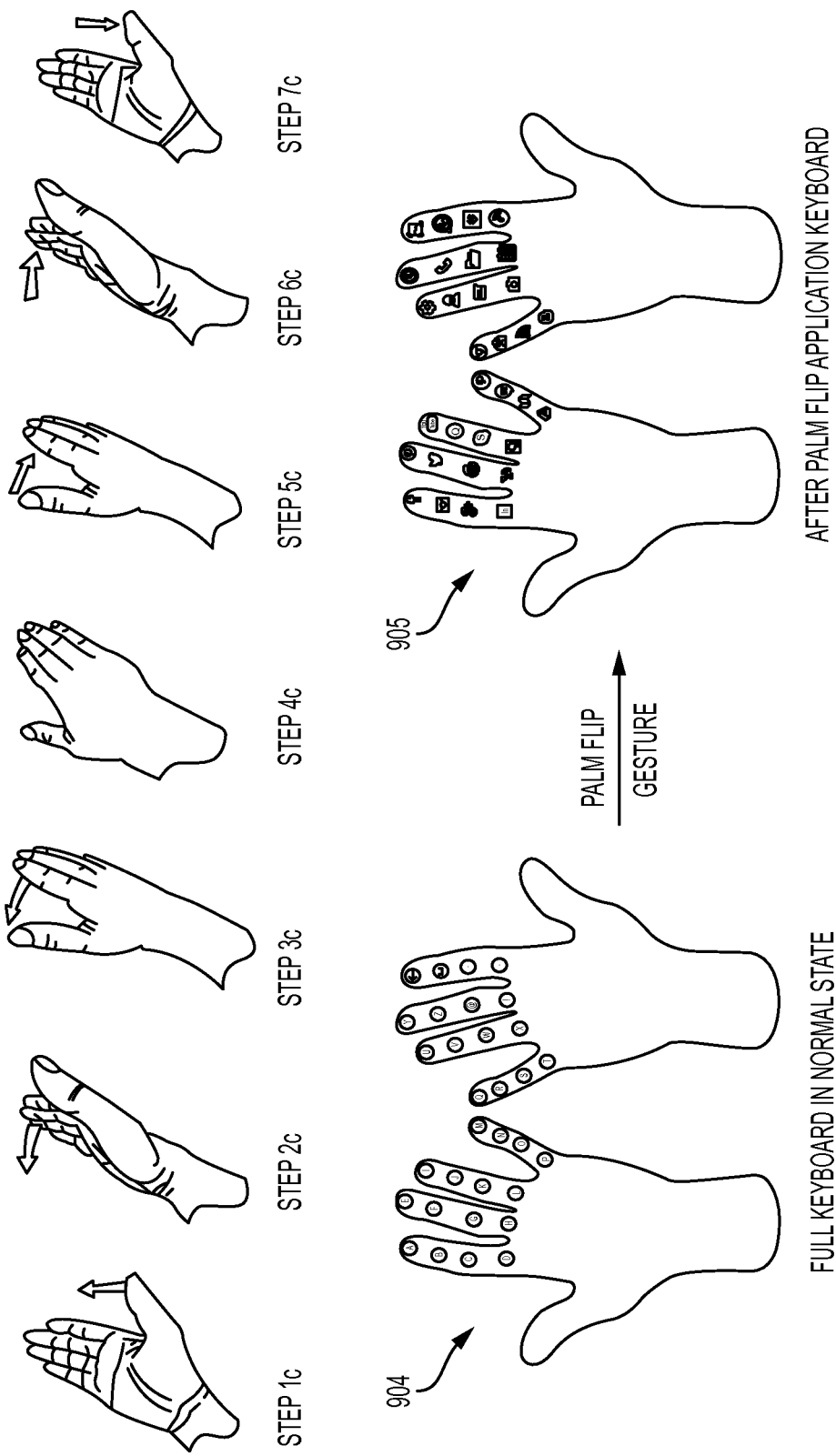
FIG. 9 illustrates steps for implementing a palm flip gesture for toggling between a full keyboard normal state mode and an application keyboard mode, in accordance with embodiments of the present invention.

FIG. 9 illustrates steps 1c-7c for implementing a palm flip gesture for toggling between a full keyboard normal state mode 904 and an application keyboard mode 905, in accordance with embodiments of the present invention. Steps 1c-7c illustrate differing palm flip motions for enabling a palm flip gesture. A palm gesture is enabled when a user flips his/her palms as illustrated in steps 1c-7c. If the user enables this gesture in both hands then the keyboard-views are/toggled. When the user enables a normal keyboard state mode 904 and makes a palm flip gesture he/she is presented with an application mode 905 view of the keyboard.

Figure 10A:
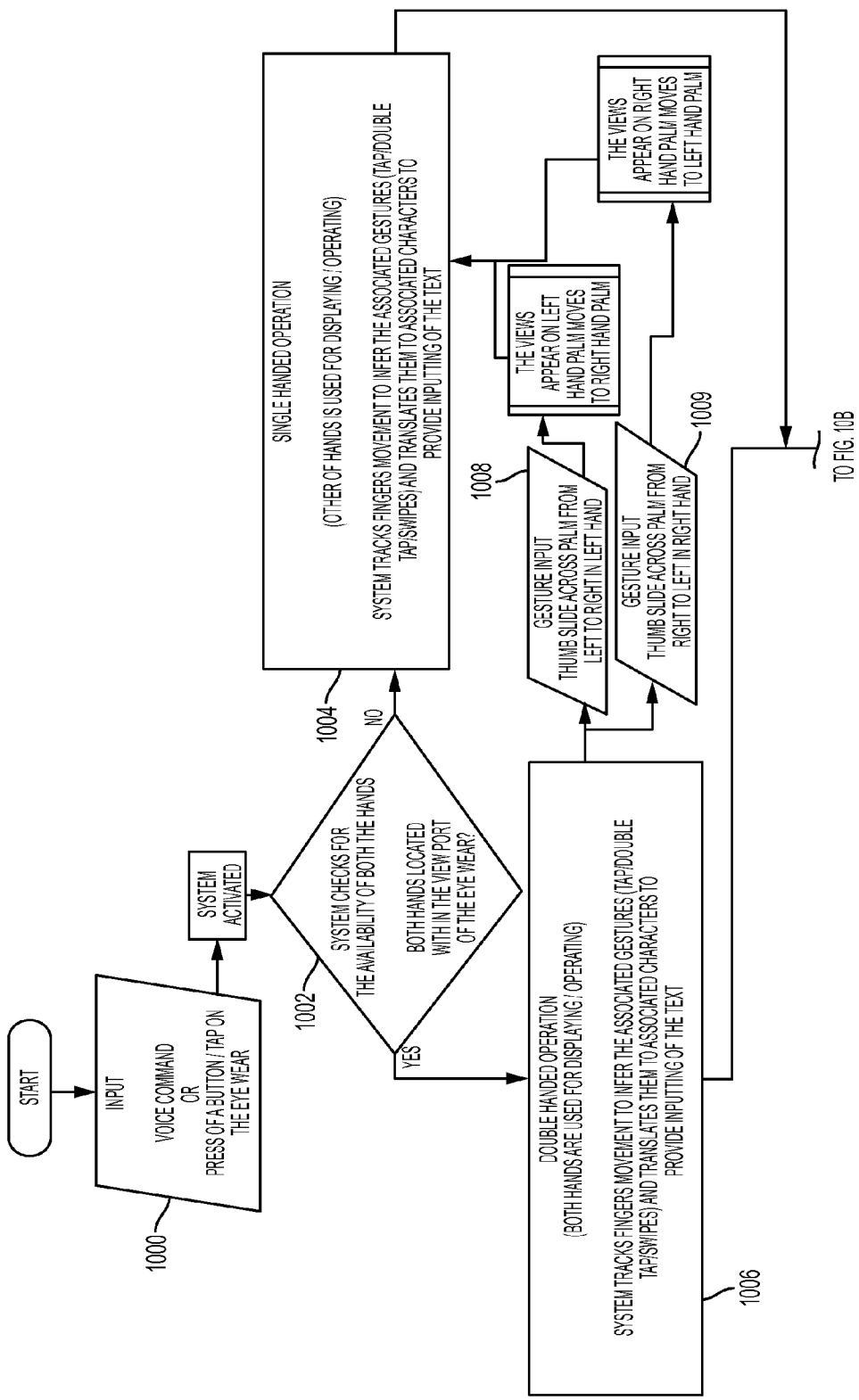
FIGS. 10A-10C, illustrates an algorithm detailing a flow of steps enabled by the specialized hardware device of FIG. 1 for selecting a functionality of a virtual input device, in accordance with embodiments of the present invention
Figure 10B:
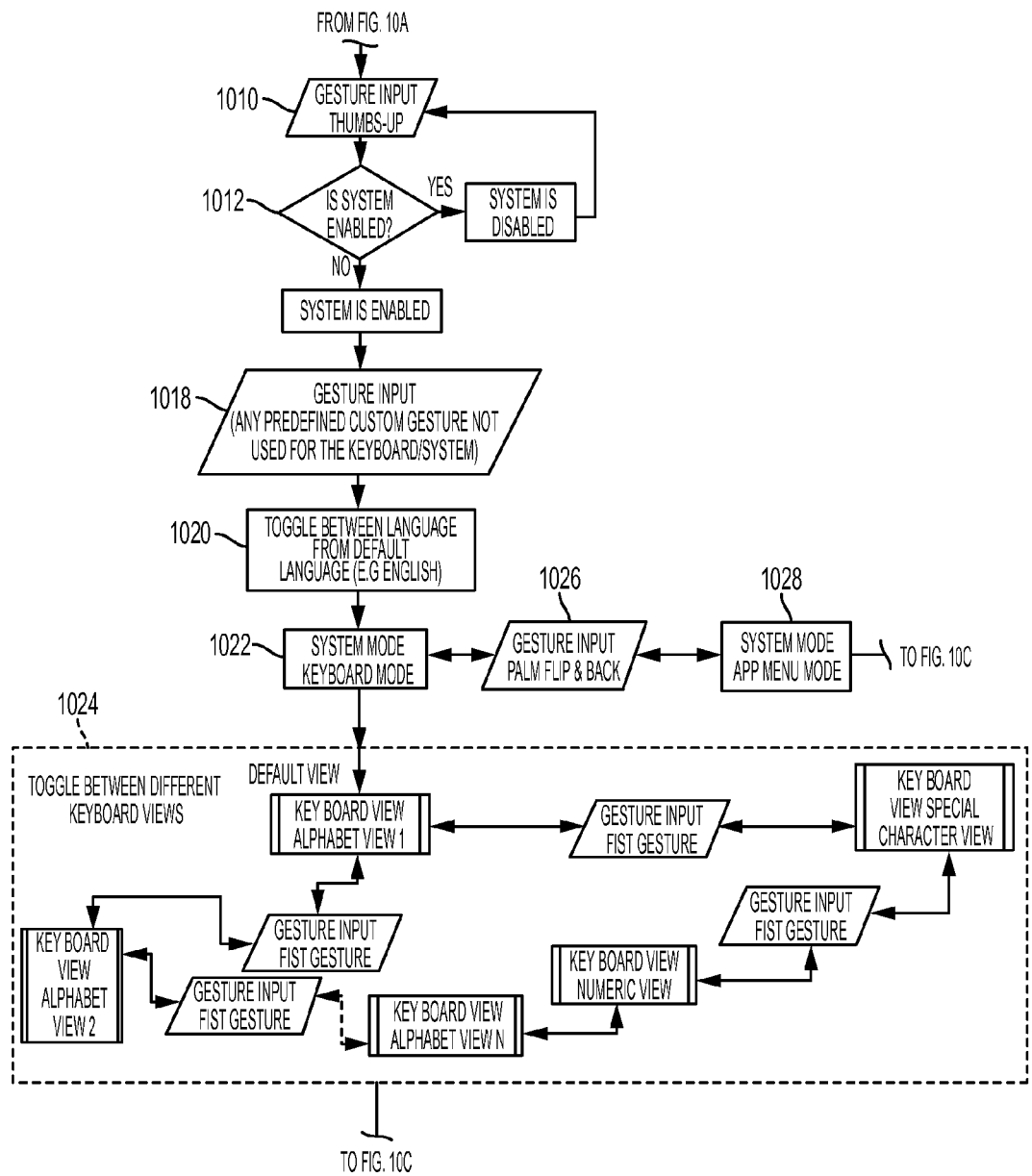
Figure 10C:
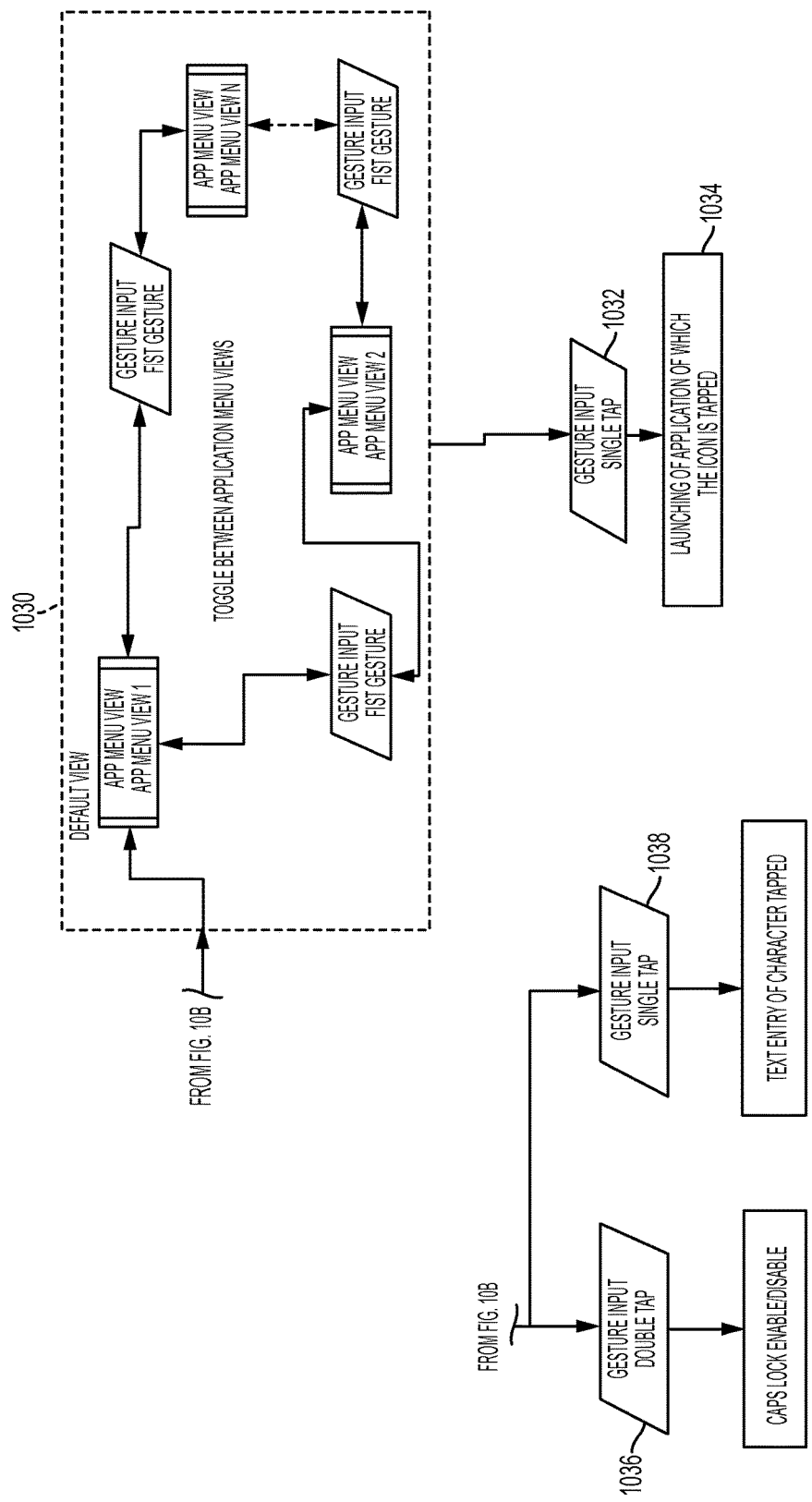

FIG. 10, including FIGS. 10A-10C, illustrates an algorithm detailing a flow of steps enabled by the specialized hardware device (i.e., comprising an eyewear based video display enabled computing device or independent from an eyewear based video display enabled computing device) of FIG. 1 for selecting a functionality of a virtual input device, in accordance with embodiments of the present invention. Each of the steps in the algorithm of FIG. 10 may be enabled and executed by a computer processor executing computer code. In step 1000, a command (i.e., voice based command or manually initiated command) is enabled (by a user) to activated the hardware device. In step 1002, the hardware device determines if a single hand or two hands are available for input interaction. If in step 1002, it is determined that only a single hand is available then in step 1004, a single handed operation mode is enabled and step 1010 is executed as described, infra. If in step 1002, it is determined that both hands are available then in step 1006 double handed operation is enabled and steps 1008 and 1009 initiate right handed (step 1009) or left handed (step 1008) operation and step 1004 is executed. Alternatively, a doubled handed operation mode is enabled in step 1006 and a thumbs up gesture is initiated (to enable the virtual input device) in step 1010. Step 1012 determines if the virtual input device has been successfully enabled. If the virtual input device is determined to be disabled then step 1010 is repeated. If the virtual input device is determined to be enabled then in step 1018, a gesture input is executed and in step 1020, a specified language for input is selected. In step 1022, a system mode (i.e., a keyboard or application menu mode) is selected.

If a keyboard mode is selected in step 1022, then in step 1024 various gestures are enabled for input functions and in steps 1036 and 1038 double or single tap gestures are enabled to a caps lock function and text/character based function.

If an application menu mode is selected in step 1022, then in step 1030 various gestures enable various application menus and in step 1032 a single tap gesture is enabled. In step 1034, a selected application is launched.

Figure 11:
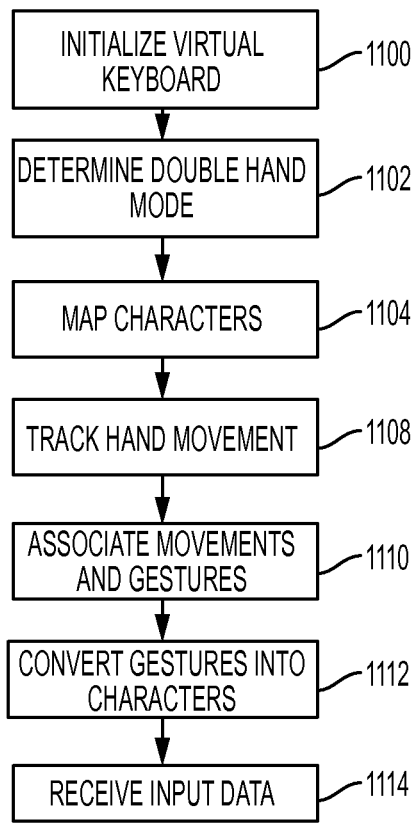
FIG. 11 illustrates an algorithm detailing a flow of steps enabled by the specialized hardware device of FIG. 1 for interacting with a virtual input device, in accordance with embodiments of the present invention.

FIG. 11 illustrates an algorithm detailing a flow of steps enabled by the specialized hardware device (i.e., comprising an eyewear based video display enabled computing device or independent from an eyewear based video display enabled computing device) of FIG. 1 for interacting with a virtual input device, in accordance with embodiments of the present invention. Each of the steps in the algorithm of FIG. 11 may be enabled and executed by a computer processor executing computer code. In step 1100, a virtual keyboard (viewable via an eyewear based video display enabled computing device) is in response to a command from a user. In step 1102, it is determined that two hands of the user are viewable via a view screen of the eyewear based video display enabled computing device. In step 1104, characters or symbols of the virtual keyboard are mapped to a position and associated scaling of the two hands of the user. In step 1108, movements of the two hands are tracked. In step 1110, movements are associated (based on the tracking) with associated gestures enabled by the movements. In step 1112, the associated gestures are converted into associated characters or symbols. In step 1114, input data specified by the user is received via the associated characters or symbols enabled by the user. Alternatively, the aforementioned algorithm may be executed in a single handed (i.e., for a single hand) mode.

Figure 12:
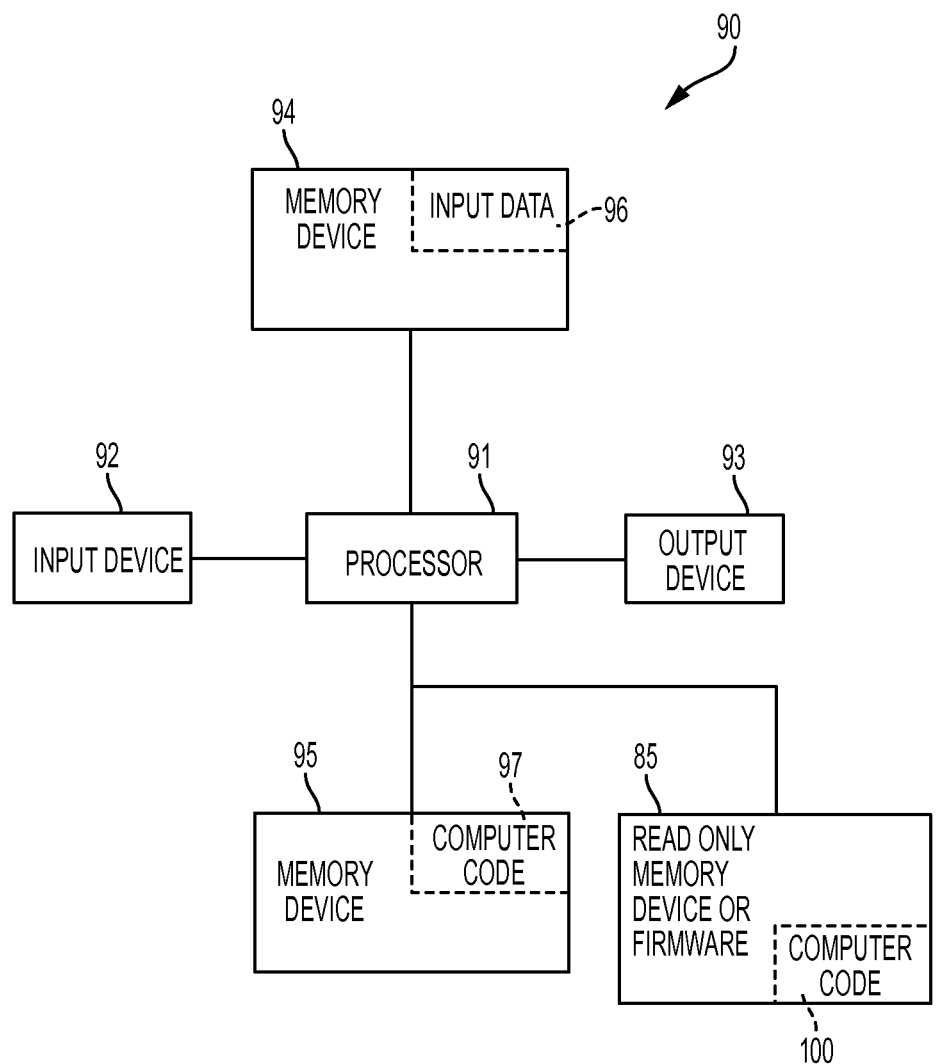
FIG. 12 illustrates a computer system used by or comprised by the specialized hardware device of FIG. 1 for enabling a process for selecting a functionality and interacting with an input device, in accordance with embodiments of the present invention.

FIG. 12 illustrates a computer system 90 used by or comprised by the specialized hardware device of FIG. 1 for enabling a process for selecting a functionality and interacting with an input device, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 12 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 1, 5, 10, and 11) for enabling a process for selecting a functionality and interacting with an input device. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 84 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to select a functionality and interact with an input device. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for selecting a functionality and interacting with an input device. In another embodiment, the invention provides a business method that performs the process steps of the invention on a subscription, advertising, and/or fee basis. That is, a service supplier, such as a Solution Integrator, could offer to enable a process for selecting a functionality and interacting with an input device. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 12 shows the computer system 90 as a particular configuration of hardware and software, any configuration of hardware and software, as would be known to a person of ordinary skill in the art, may be utilized for the purposes stated supra in conjunction with the particular computer system 90 of FIG. 12. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:
1. An input device interaction method comprising:
  initializing, by a computer processor of an embedded computing device comprised by an eyewear based video display enabled computing device in response to a hand based gesture thumb swipe enabled command from a user, a virtual keyboard viewable via said eyewear based video display enabled computing device, wherein said eyewear based video display enabled computing device comprises a prescriptive lens for correcting a vision deficiency of said user;

determining, by said computer processor, that two hands of said user are viewable via a view screen of said eyewear based video display enabled computing device;

mapping, by said computer processor, characters or symbols of said virtual keyboard to a position and associated scaling of said two hands of said user;

tracking, by said computer processor, movements of said two hands;

associating, by said computer processor based on said tracking, said movements with associated gestures enabled by said movements;

converting, by said computer processor, said associated gestures into associated characters or symbols of said characters or symbols;

virtually super-imposing, by said processor based on results of said mapping, said associated characters on finger tips and finger joints of said two hands of said user such that a character map comprising said associated characters virtually super-imposed on said finger tips and finger joints of said two hands is presented, without said virtual keyboard, to said user via said eyewear based video display enabled computing device;

receiving, by said computer processor from said associated characters or symbols virtually super-imposed and enabled by said user, input data specified by said user;

switching during said virtually super-imposing, by said computer processor in response to said user performing an additional hand based gesture including a palm flip gesture, between different virtual keyboard views and associated modes;

virtually toggling, by said computer processor in response to said user performing a further hand based gesture, between an alphabetical virtual keyboard and numerical virtual keyboard virtual view of said virtual keyboard via said eyewear based video display;

disabling, by said computer processor in response to said user performing a thumb related gesture command, said virtual keyboard; and deactivating, by said processor in response to said disabling, said eyewear based video display and associated sensor devices.

2. The method of claim 1, wherein said two hands comprise associated palms and finger tips and finger joints viewable via said view screen.

3. The method of claim 1, wherein said command comprises a voice command executed by said user.

4. The method of claim 1, wherein said command comprises a switch activated command executed by said user.

5. The method of claim 4, wherein said switch activated command is activated by a switch selected from the group consisting of a physical switch and a virtual switch.

6. The method of claim 1, wherein said tracking said movements of said at least one hand comprises tracking movements of fingers and associated finger joints of said at least one hand.

7. The method of claim 1, wherein said associated gestures comprise gestures selected from the group consisting of finger tap gestures, finger swipe gestures, and custom gestures with respect to associated actions, events and interactions.

8. The method of claim 1, wherein custom gestures comprise gestures selected from the group consisting of a closing and opening with respect to a fist gesture, a thumbs tap gesture, a thumbs up gesture, and a directional thumb slide across palm gesture.

9. The method of claim 1, wherein said input data comprises text input associated with said virtual keyboard and event trigger data associated with an application menu of said embedded computing device.

10. The method of claim 1, further comprising:
switching, by said computer processor, between a single hand operation mode and a double hand operation mode.

11. The method of claim 1, further comprising:
switching, by said computer processor, between a keyboard based layout and application menu layouts.

12. The method of claim 1, further comprising:
converting, by said computer processor, said associated gestures into associated commands for enabling or disabling said embedded computing device.

13. The method of claim 1, further comprising:
providing at least one support service for at least one of creating, integrating, hosting, maintaining, and deploying computer-readable code in the computing system, said code being executed by the computer processor to implement: said initializing, said determining, said mapping, said tracking, said associating, said converting, and said receiving.

14. An embedded computing device comprising a computer processor coupled to a computer-readable memory unit, said memory unit comprising instructions that when executed by the computer processor implements an input device interaction method comprising:

initializing, by said computer processor in response to a hand based gesture thumb swipe enabled command from a user, a virtual keyboard viewable via said eyewear based video display enabled computing device, wherein said eyewear based video display enabled computing device comprises a prescriptive lens for correcting a vision deficiency of said user;

determining, by said computer processor, that two hands of said user are viewable via a view screen of said eyewear based video display enabled computing device;

mapping, by said computer processor, characters or symbols of said virtual keyboard to a position and associated scaling of said two hands of said user;

tracking, by said computer processor, movements of said two hands;

associating, by said computer processor based on said tracking, said movements with associated gestures enabled by said movements;

converting, by said computer processor, said associated gestures into associated characters or symbols of said characters or symbols;

virtually super-imposing, by said processor based on results of said mapping, said associated characters on finger tips and finger joints of said two hands of said user such that a character map comprising said associated characters virtually super-imposed on said finger tips and finger joints of said two hands is presented, without said virtual keyboard, to said user via said eyewear based video display enabled computing device;

receiving, by said computer processor from said associated characters or symbols virtually super-imposed and enabled by said user, input data specified by said user;

switching during said virtually super-imposing, by said computer processor in response to said user performing an additional hand based gesture including a palm flip gesture, between different virtual keyboard views and associated modes;

virtually toggling, by said computer processor in response to said user performing a further hand based gesture, between an alphabetical virtual keyboard and numerical virtual keyboard virtual view of said virtual keyboard via said eyewear based video display;

disabling, by said computer processor in response to said user performing a thumb related gesture command, said virtual keyboard; and deactivating, by said processor in response to said disabling, said eyewear based video display and associated sensor devices.

15. The embedded computing device of claim 14, wherein said two hands comprise associated palms and finger tips and finger joints viewable via said view screen.

16. The embedded computing device of claim 14, wherein said command comprises a voice command executed by said user.

17. The embedded computing device of claim 14, wherein said command comprises a switch activated command executed by said user.

18. The embedded computing device of claim 17, wherein said switch activated command is activated by a switch selected from the group consisting of a physical switch and a virtual switch.

19. A computer program product, comprising a computer readable hardware storage device storing a computer readable program code, said computer readable program code comprising an algorithm that when executed by a computer processor of an embedded computing device implements an input device interaction method, said method comprising:

initializing, by said computer processor in response to a hand based gesture thumb swipe enabled command from a user, a virtual keyboard viewable via said eyewear based video display enabled computing device, wherein said eyewear based video display enabled computing device comprises a prescriptive lens for correcting a vision deficiency of said user;

determining, by said computer processor, that two hands of said user are viewable via a view screen of said eyewear based video display enabled computing device;

mapping, by said computer processor, characters or symbols of said virtual keyboard to a position and associated scaling of said two hands of said user;

tracking, by said computer processor, movements of said two hands;

associating, by said computer processor based on said tracking, said movements with associated gestures enabled by said movements;

converting, by said computer processor, said associated gestures into associated characters or symbols of said characters or symbols;

virtually super-imposing, by said processor based on results of said mapping, said associated characters on finger tips and finger joints of said two hands of said user such that a character map comprising said associated characters virtually super-imposed on said finger tips and finger joints of said two hands is presented, without said virtual keyboard, to said user via said eyewear based video display enabled computing device;

receiving, by said computer processor from said associated characters or symbols virtually super-imposed and enabled by said user, input data specified by said user;

switching during said virtually super-imposing, by said computer processor in response to said user performing an additional hand based gesture including a palm flip gesture, between different virtual keyboard views and associated modes;

virtually toggling, by said computer processor in response to said user performing a further hand based gesture, between an alphabetical virtual keyboard and numerical virtual keyboard virtual view of said virtual keyboard via said eyewear based video display;

disabling, by said computer processor in response to said user performing a thumb related gesture command, said virtual keyboard; and deactivating, by said processor in response to said disabling, said eyewear based video display and associated sensor devices.

* * * * *